(12) United States Patent
Oternaud (10) Patent No.: US 12,186,958 B2
(45) Date of Patent: Jan. 7, 2025

(54) MACHINE FOR OBTAINING A BI-MATERIAL PART

(71) Applicant: CVA Technology Pure Silicone Group AG, Lausanne (CH)

(72) Inventor: Nicolas Oternaud, Zurich (CH)

(73) Assignee: CVA Technology Pure Silicone Group AG, Lausanne (CH)

( * ) Notice: Subject to any disclaimer, the term of this patent is extended or adjusted under 35 U.S.C. 154(b) by 355 days.

(21) Appl. No.: 17/761,614

(22) PCT Filed: Sep. 18, 2020

(86) PCT No.: PCT/EP2020/076109
§ 371 (c)(1),
(2) Date: Mar. 18, 2022

(87) PCT Pub. No.: WO2021/053144
PCT Pub. Date: Mar. 25, 2021

(65) Prior Publication Data
US 2022/0379537 A1    Dec. 1, 2022

(30) Foreign Application Priority Data
Sep. 19, 2019    (FR) ...................... 1910340

(51) Int. Cl.
*B29C 45/73*    (2006.01)
*B29C 45/00*    (2006.01)
(Continued)

(52) U.S. Cl.
CPC .......... *B29C 45/73* (2013.01); *B29C 45/0001* (2013.01); *B29C 45/1459* (2013.01);
(Continued)

(58) Field of Classification Search
CPC .......... B29C 45/14065; B29C 45/1459; B29C 45/14598; B29C 2045/1436; B29C 2045/14295
See application file for complete search history.

(56) References Cited

FOREIGN PATENT DOCUMENTS

| DE | 198 48 246 A1 | 4/2000 |
|----|---------------|--------|
| FR | 2 500 370 A1  | 8/1982 |

(Continued)

OTHER PUBLICATIONS

French Patent Application No. 19 10340, INPI Rappoort de Recherche Préliminaire, May 13, 2020, 2 pages.
(Continued)

*Primary Examiner* — Edmund H Lee
(74) *Attorney, Agent, or Firm* — Soquel Group LLC (57) ABSTRACT

A machine including a mold which delimits an overmolding cavity, for receiving a hollow portion of a bi-material part, cooling means along the overmolding cavity, a core positionable inside the hollow portion and containing heating means for bringing the core to a heating temperature higher than 150° C., and an injector injecting an overmolding material, formed by the core and the hollow portion, for forming an inner portion of the bi-material part. In order to obtain the overmolded inner portion even if the hollow portion has poor heat resistance, the cooling means maintain the overmolding cavity at a cooling temperature lower than 110° C. while the core is brought to the heating temperature, while the overmolding material has been injected by the injector into the overmolding cavity.

11 Claims, 3 Drawing Sheets

(51) Int. Cl.
  *B29C 45/14* (2006.01)
  *B29C 45/26* (2006.01)
  *B29K 83/00* (2006.01)
  *B29K 623/00* (2006.01)
  *B33Y 80/00* (2015.01)

(52) U.S. Cl.
  CPC .. *B29C 45/2616* (2013.01); *B29C 2045/7343* (2013.01); *B29C 2045/735* (2013.01); *B29K 2083/005* (2013.01); *B29K 2623/06* (2013.01); *B29K 2905/10* (2013.01); *B33Y 80/00* (2014.12)

(56) References Cited

FOREIGN PATENT DOCUMENTS

| | | | |
|---|---|---|---|
| KR | 100787735 | * | 12/2007 |
| WO | 99/56922 A1 | | 11/1999 |

OTHER PUBLICATIONS

PCT Application No. PCT/EP2020/076109, Internataional Search Report, Dec. 10, 2020, 2 pages.

* cited by examiner

MACHINE FOR OBTAINING A BI-MATERIAL PART

CROSS-REFERENCE TO RELATED APPLICATIONS

This application claims benefit under 35 USC § 371 of PCT Application No. PCT/EP2020/076109 entitled MACHINE AND METHOD FOR OBTAINING A BI-MATERIAL PART, METHOD FOR MANUFACTURING THE MACHINE, filed on Sep. 18, 2020 by inventor Nicolas Oternaud. PCT Application No. PCT/EP2020/076109 claims priority of French Patent Application No. 19 10340, filed on Sep. 19, 2019.

FIELD OF THE INVENTION

This invention concerns a machine for obtaining a bi-material piece, a method for obtaining the bi-material piece using the machine, and a method for manufacturing the machine.

The invention concerns the field of machines and methods for moulding and over-moulding a plastic part, but may also apply to other materials.

BACKGROUND OF THE INVENTION

A method for over-moulding a liquid silicone elastomer over a metal support is known from the prior art. The over-moulded assembly thus obtained is a bi-material assembly, with the silicone on the outside and the metal support on the inside. During the over-moulding process, the support is placed in a mould, and the liquid silicone is injected at room temperature (RT); the liquid silicone is injectable as long as it has not been crosslinked. To solidify the silicone thus over-moulded and bond it to the support, it is necessary to bake it in order to crosslink the silicone in situ by bringing the mould to a relatively elevated temperature of approximately 200° C. This is no problem when the support is metal or made of any material capable of withstanding such a high temperature as well as the injection pressure. Thus, it is difficult, if not impossible, to make an over-moulded part when the support material has been degraded by the effects of the baking temperature. In particular, it would be hard to imagine making a thermoplastic polymer support with a relatively low glass transition temperature such as acrylonitrile-butadiene-styrene or polyethylene.

It is even more difficult to over-mould with liquid silicone inside a hollow support made of a material that has been degraded by the heat of the baking, given that the heat supplied by the mould in order to crosslink the over-moulding material is first transferred to the hollow support before reaching the inside of the hollow support in order to bake the liquid silicone, thus causing it to deteriorate.

Thus, the invention seeks, inter alia, to overcome the disadvantageous of the aforementioned prior art by proposing a new machine that can obtain a bi-material part including an over-moulded inner part even if the hollow part is not particularly heat-resistant.

SUMMARY OF THE DESCRIPTION

The invention concerns a machine for obtaining a bi-material part, comprising:
a mould delimiting an over-moulding housing configured to receive a hollow part of the bi-material part;
cooling means arranged along the housing;
at least one core, at least one part of which is positionable within the hollow part when the hollow part is received within the over-moulding housing, wherein the at least one core contains means for heating the machine, wherein the heating means are configured to bring the at least one core to a heating temperature greater than 150° C., preferably between 180 and 220° C., e.g. 200° C.; and
an injector configured to inject an over-moulding material into the over-moulding housing via the mould when the over-moulding material is in an injectable state, such that the over-moulding material enters the housing to be shaped radially inward by the at least one core and radially outward by the hollow part, so as to form an inner part of the bi-material part over-moulded over the inside of the hollow part, wherein the cooling means are configured to keep the over-moulding housing at a cooling temperature of less than 110° C., preferably between 70 and 100° C., e.g. 80° C., whilst the at least one core is brought to the heating temperature by the heating means in order to transition the over-moulding material from the injectable state to a crosslinked state when the over-moulding material has been injected into the housing by the injector.

One underlying idea of the invention is to supply the heat necessary for crosslinking the over-moulding material via the at least one core, i.e. from the inside of the bi-material part, so as to effectively ensure that the over-moulding material transitions from the injectable state, in which it is, e.g., liquid or viscous, to the crosslinked state in which the over-moulding material takes on its final fixed form, and is preferably rubbery at room temperature. At the same time, in order to avoid degradation of the hollow part, the bi-material part is heated from the outside; the mould and the cooling means act as a cocoon that cools the hollow part, thus keeping it from degrading whilst the over-moulding material is cured.

Other optional and advantageous characteristics of the invention, which are contemplated in any combination technically possible, are defined infra.

Preferably, the cooling means comprise at least one coolant line.

Preferably, the mould comprises at least one cavity contiguously forming at least one part of the over-moulding housing and the at least one coolant line.

Preferably, the at least one core comprises: an outer over-moulding material conformance layer to form the inner part, wherein the outer layer is preferably formed of stainless steel; and a thermally conductive core radially surrounded by the outer layer that delimits a heater housing receiving at least part of the heating means, wherein the core is preferably formed of beryllium bronze.

Preferably, the heating means comprise an electrical heating cartridge contained within the at least one core.

Preferably, for each core, the machine comprises: a respective carriage to which the core is affixed, wherein the carriage is movable relative to the mould in order to position the core within the hollow part when the hollow part is received within the over-moulding housing; and a respective heat insulating member formed of a titanium-based alloy and interposed between the carriage and the core.

The invention also concerns a method for obtaining a bi-material part using a machine as described supra, the method comprising the following steps:
injecting, by means of the injector, an over-moulding material into the over-moulding housing via the mould when the over-moulding material is in an injectable state, such that the over-moulding material enters the housing to be shaped radially inward by the at least one core and radially outward by the hollow part, so as to form the inner part of the bi-material part over-moulded over the inside of the hollow part, and keeping the over-moulding housing at the cooling temperature whilst the at least one core is brought to the heating temperature by the heating means in order to transition the over-moulding material from the injectable state to the crosslinked state when the over-moulding material has been injected by the injector into the over-moulding housing.

Other optional and advantageous characteristics of the invention, which are contemplated in any combination technically possible, are defined infra.

Preferably, the over-moulding material is elastomer-based, with the elastomer preferably being a liquid silicone.

Preferably, the hollow part is made of a thermoplastic polymer-based support material having a glass transition temperature of less than 120° C., the thermoplastic polymer preferably being a polyethylene.

Preferably, the injector comprises an injection nozzle opening into the over-moulding housing.

Preferably, the hollow part comprises a radial opening for transverse injection.

Preferably, the method comprises, in order to inject the over-moulding material, the hollow part being positioned such that the radial opening extends the injection nozzle, the over-moulding material thus being injected by the injector into the hollow part via the radial opening.

The invention also concerns a method for manufacturing a machine as described supra, wherein the cooling means comprise at least one coolant line; and wherein the mould comprises at least one cavity contiguously forming at least one part of the over-moulding housing and the at least one coolant line, the method comprising producing the at least one cavity by additive manufacturing, preferably by laser fusion.

BRIEF DESCRIPTION OF THE DRAWINGS

The following description concerns exemplary embodiments of the invention, provided without limitation and by reference to the drawings appended hereto, in which.

DETAILED DESCRIPTION OF EMBODIMENTS

Figure 1:
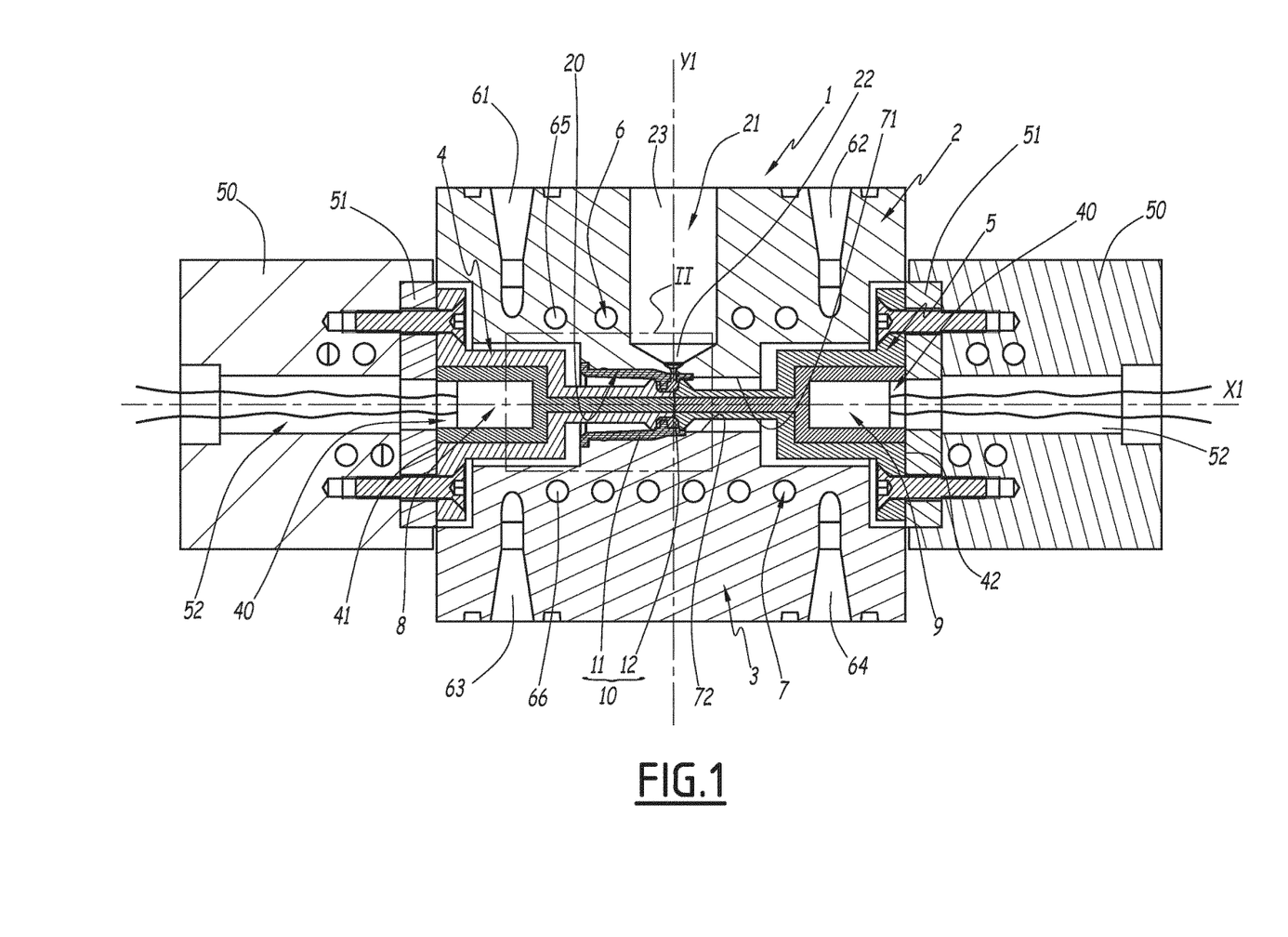
FIG. 1 is a longitudinal section of a machine according to a first embodiment of the invention.
Figure 2:
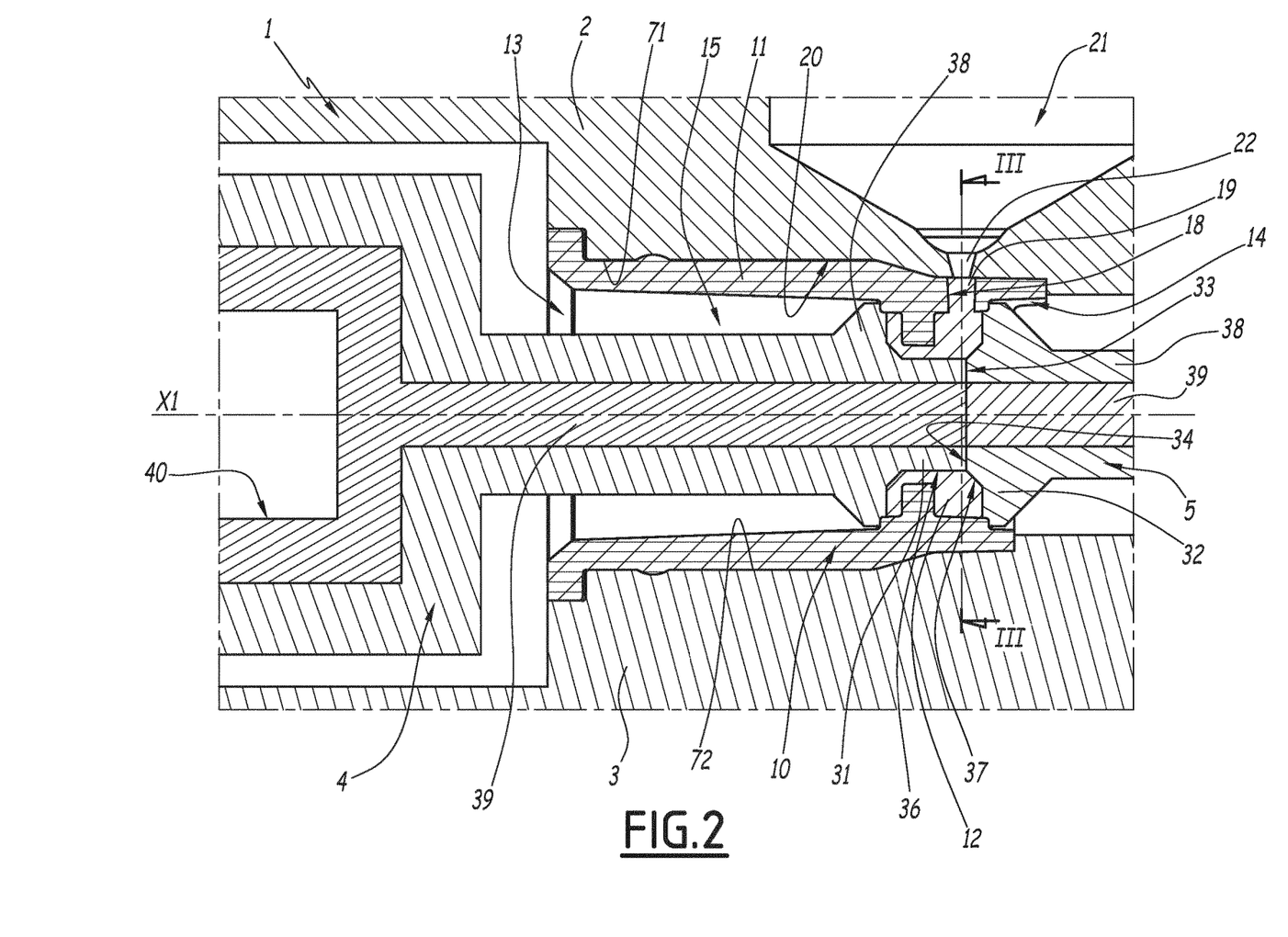
FIG. 2 is a detail view of FIG. 1.
Figure 3:
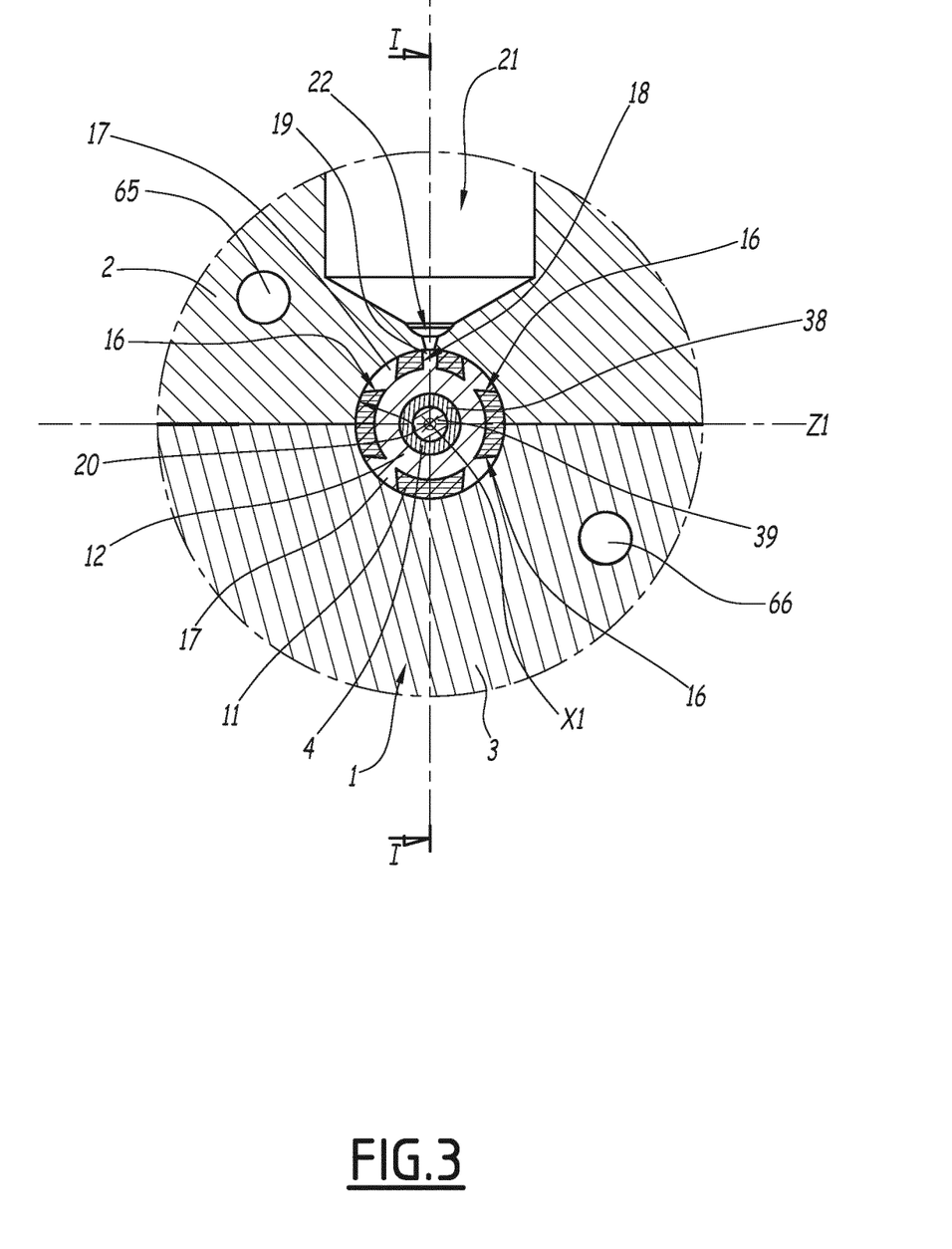
FIG. 3 is a cross-section of FIG. 2 along a line III-III showing a section I-I of FIGS. 1 and 2.

FIG. 1-3 show a machine, essentially comprising a mould 1 comprising two cavities 2 and 3 and having cooling means (6, 7) 6 and 7, as well as an injector 21, the mould 1 also comprising two cores 4 and 5 including heating means 8 and 9. The machine is designed to obtain a bi-material part 10 comprising an outer hollow part 11 and an inner part 12 that is connected to the hollow part 11 by being over-moulded over the inside of the hollow part 11.

The mould 1 defines a longitudinal axis X1. In particular, the longitudinal axis X1 is fixed relative to the cavity 2, which is, itself, fixed, or at least serves as a point of reference. The cavity 3 is movable relative to the cavity 2, here in translation along a radial axis Y1 that is fixed relative to the cavity 2 and preferably orthogonal to the axis X1. Additionally, a radial axis Z1 is defined that is fixed relative to the cavity 2, concurrent with and perpendicular to the axes X1 and/or Y1. The axis Z1 can be seen in FIG. 3. A bond line X1Z1 of the machine is defined by the axes X1 and Z1, and is fixed relative to the cavity 2. Expressions such as 'longitudinal' or 'axial' refer to the axis X1, whilst expressions such as 'radial' or 'transverse' refer to the axes Y1 and Z1.

The bi-material part 10 is 'bi-material' in the sense that the hollow part 11 and the inner part 12 are made of two respective materials, the application' temperature and/or composition of which are significantly different.

The inner part 12 is made of an over-moulding material, i.e. one suited to be moulded over the hollow part 11 when the hollow part 11 has already been formed, and has preferably taken on its final form. The hollow part 11 is made of a support material for over-moulding, i.e. a material suited to shape the over-moulding material of the hollow part 11 at least partially, and, advantageously, to bond to the over-moulding material whilst the latter is being over-moulded.

The bi-material part 10 may be used for numerous applications, acting, e.g., as a sealing element for a motor vehicle, a cooking utensil, a conduit or junction for fluid, a plug to close a container, or a container for a household, food, cosmetic, or pharmaceutical product.

Here, the support material forms the entirety of the hollow part 11, and is advantageously based on a thermoplastic polymer, preferably a polyethylene. More generally, it is preferably provided for the support material to be a thermoplastic polymer having a glass transition temperature of less than 120° C., as is the case with polyethylene, but also acrylonitrile-butadiene-styrene.

Here, the over-moulding material forms the entirety of the inner part 12, and is advantageously elastomer-based, preferably on a liquid silicone elastomer sometimes referred to by the abbreviation 'LSR'. More generally the over-moulding material selected for the inner part 12 has, on the one hand, a state in which the over-moulding material is injectable or flowable, i.e. sufficiently softened or liquefied to be injected or flowed into a mould for shaping, and, on the other hand, a crosslinked state, i.e. a state in which the over-moulding material is transformed, preferably definitively transformed, so as to be fixed in the form provided by the mould whilst having particular properties such as, in the case of the elastomer, significant elasticity at RT. The over-moulding material under consideration here transitions from the injectable state to the crosslinked state when it is subjected to a temperature that is high enough to cause it to crosslink, e.g. a heating temperature between 150 and 220° C., preferably between 180 and 220° C., e.g. 200° C. The crosslinked state is advantageously a vulcanised state.

One particular characteristic of the bi-material part 10 is that the heating temperature necessary to transition the over-moulding material of the inner part 12 to its crosslinked state is greater than the glass transition temperature of the support material of the hollow part 11.

Preferably, as shown in the figures, the hollow part 11 is annular in shape, and is positioned coaxially with the axis X1 in the machine whilst, for example, being radially traversed by the axes Y1 and Z1.

The hollow part 11 comprises two longitudinal ends 13 and 14, which are traversed by the axis X1 when the hollow part 11 is positioned in the machine and are preferably open, such that the hollow part 11 is generally annular or tubular in shape. On the inside, the hollow part 11 forms a longitudinal housing 15 that longitudinally traverses and connects the ends 13 and 14. If the hollow part 11 is blind, the housing 15 only opens to one of the ends 13 or 14. Alternatively, it may be provided for the two ends 13 and 14 to be open and connected via the housing 15, but for a partition (not shown) to close off the housing 15 such that the ends 13 and 14 do not communicate.

Preferably, the inner part 12 is also annular, and is coaxial with the hollow part 11. When the part 10 is positioned in the machine, the inner part 12 is coaxial with the axis X1, and is, for example, radially traversed by the axes Y1 and Z1.

As shown in FIG. 3, the hollow part 11 advantageously comprises one or more radial attachment openings 16 (here 4), with each radial attachment opening 16 traversing the part 11 in a respective radial direction, i.e. perpendicular to the axis X1, whilst connecting the inside to the outside of the part 11. Here, the openings 16 are regularly distributed about the axis X1.

Preferably, as shown in FIG. 3, the inner part 12 comprises radial anchors 17, with some or each of the radial openings 16 receiving one of the radial anchors 17 such that the inner part 12 is affixed to the hollow part 11 via the anchoring of the anchors 17 in the radial openings 16.

Preferably, the hollow part 11 advantageously comprises one or more radial injection openings 18 (here 1) coaxial to the axis Y1 and traversing the part 11 whilst connecting the inside to the outside of the part 11. The inner part 12 advantageously comprises a radial anchor 19 that is also coaxial with the axis Y1, which enters the opening 18.

The mould 1 delimits a housing 20, which is designed to receive the hollow part 11. Preferably, the cavity 2 forms a first part 71 of the housing 20, and the cavity 3 forms a second, complementary, part 72 of the housing 20. In the example shown in FIGS. 1 and 2, the cavity 2 forms a part of the housing 20 that extends on a first side of the bond line X1Z1 defined by the axes X1 and Z1, with the cavity 3 forming the other part of the housing 20. When the cavity 3 is moved away from the cavity 2 along the axis Y1, the mould 1, in particular its housing 20, is open. When the cavity 3 is made to abut the cavity 2 on the axis Y1, the mould 1, in particular the housing 20, is closed. Once closed, the housing 20 is preferably coaxial with the axis X1, allowing for the part 11 to be positioned coaxially with the axis X1. Once it is close, when the cores 4 and 5 are received within it, the housing 20 is advantageously sealed and withstands an injection pressure of the over-moulding material within it.

The housing 20 acts as an over-moulding housing, given that the over-moulding of the part 12 is carried out when the hollow part 11 is received and positioned within the housing 20. Preferably, the housing 20 conforms to the outer contours of the part 11, in particular like a cocoon, as shown in the figures. At a minimum, the outside of the part 11 is in contact with the housing 20 in order to be positioned in the mould 1. More generally, the housing 20 advantageously acts as an external radial support for the part 11 when the housing 20 is closed and the over-moulding material is injected, preferably under pressure, in order to form the part 12.

Each core 4 and 5 is mobile in translation along the axis X1 relative to the mould 1, in particular relative to the cavity 2. In particular, each core 4 and 5 is advantageously coaxial with the axis X1. As shown in FIGS. 1 and 2, when the mould 1 is closed, the core 4 is positioned so that the core 4 will close off a first axial end of the housing 20. Likewise, the core 5 is positioned so that it will close off a second axial end of the housing 20, which is opposite the first axial end. In order to close off the housing 20, the cores 4 and 5 preferably axially abut the hollow part 11, such that the hollow part radially connects the cores 4 and 5 to the housing 20.

The part 10 obtained can be extracted from the housing 20 by opening the mould 1 and axially withdrawing the cores 4 and 5 by translating the cores 4 and 5 away from one another and from the mould 1. Advantageously, this also allows for the insertion of the hollow part 11, where it is already formed, into the housing 20 in order to over-mould the inner part 12 within the machine.

The core 4 comprises an axial end 31, and the core 5 comprises an axial end 32. When the cores 4 and 5 are positioned so as to close off the axial ends of the housing 20, the ends 31 and 32 are positioned within the housing 15 of the part 11 that is received within the housing 20. When the cores 4 and 5 are positioned in this manner, the ends 31 and 32 advantageously abut one another along the axis X1, here via a respective axial surface 33 and 34 of the ends 31 and 32. Then, the surfaces 33 and 34 are positioned radially within the part 11. The surfaces 33 and 34 are advantageously traversed by the axis X1. The ends 31 and 32 each define a respective outer contour surface 36 and 37. The surfaces 36 and 37 respectively extend radially around the surfaces 33 and 34, and are, e.g., coaxial with the axis X1. The surfaces 36 and 37 serve to shape the over-moulding material of the inner part 12. The surface 36 advantageously shapes a first axial end of the inner part 12, whilst the surface 37 shapes a second, opposite, axial end of the inner part 12. The combination of the surfaces 36 and 37, when the surfaces 33 and 34 are in contact, advantageously shapes an inner surface of the inner part 12. Thus, the surfaces 36 and 37 extend at least partially into the part 11. More generally, each core 4 and 5 advantageously shapes a respective axial end and/or all or part of the inner surface of the part 12.

Preferably, each core 4 and 5, or at least one of the cores, comprises an outer layer 38 that entirely forms the contour surface 36 or 37 of the core 4 or 5 in question. Thus, the outer layer 38 serves to shape the over-moulding material in order to form the part 12. The outer layer 38 is preferably generally annular in shape and coaxial with the axis X1. For each core 4 and 5, the layer 38 extends axially up to the end 31 or 32 in question. When the cores 4 and 5 are axially in contact, the layers 38 axially abut one another, as shown in FIGS. 1 and 2, and form a peripheral part of the surfaces 33 and 34.

For the outer layer 38, a material is selected that is both hard enough to shape the over-moulding material in the injectable state and simultaneously chemically resistant to the over-moulding material and thermally conductive. The outer layer 38 is advantageously formed of stainless steel, i.e. an iron-based alloy comprising less than 1.2 wt % carbon and more than 10.5 wt % chromium. Optionally, molybdenum is included in the stainless steel in order to give it suitable temperature stability for moulding. It is particularly preferred to select a stainless steel having 0.42 wt % carbon, 14 wt % chromium, and 0.80 wt % molybdenum.

Preferably, each core 4 and 5, or at least one of them, comprises a core 39, which, at least at the end 31 or 32 of the respective core 4 or 5, is radially surrounded by the outer layer 38. In other words, the annular outer layer 38 covers the core 39 like a skin, and is preferably in contact with the core 39 over the entire perimeter of the core 39 about the axis X1. For each core 4 and 5, the core 39 is preferably coaxial with the axis X1, at least at the level of the respective end 31 or 32. For each core 4 and 5, the core 39 extends axially up to the respective end 31 or 32 and forms, e.g., a bar shape that is coaxial with the axis X1, at least at the end 31 or 32. When the cores 4 and 5 are axially in contact, the cores 39 axially abut one another, as shown in FIGS. 1 and 2, and form a central part of the surfaces 33 and 34.

Each core 4 and 5 contains one of the heating means 8 and 9.

Preferably, for each core 4 and 5, at a respective axial end 41 and 42, respectively opposite the ends 31 and 32, the core 39 is radially expanded and delimits a heating housing 40 that is coaxial with the axis X1 and opens axially. For the cores 4 and 5, respectively, the heating housing 40 receives one of the heating means 8 and 9.

The core 39 serves to conduct the heat generated by the heating means 8 or 9 of the respective core 4 or 5 so that the heat can be transmitted, via the outer layer 38, to the over-moulding material received in the housing 20.

For the core 39, a material is selected that is essentially a good heat conductor. Advantageously, the core 39 consists of beryllium bronze, i.e. a copper-based alloy comprising beryllium. Preferably, the beryllium bronze comprises 2 wt % beryllium and 0.4 wt % nickel.

Preferably, for each core 4 and 5, the machine comprises a respective carriage 50 to which the respective core 4 or 5 is affixed via its end 41 or 42, e.g. by means of screws, as shown in FIG. 1. Each carriage 50 is mobile relative to the mould 1, preferably in translation along the axis X1, in order to move and position the respective core 4 or 5, as described supra.

For each core 4 and 5, the machine comprises a respective thermal insulation member 51, advantageously in the form of a plate perpendicular to the axis X1. The member 51 is axially interposed between the carriage 50 and the end 41 or 42 of the respective core. In particular, the screws or fixation means of the core 4 or 5 traverse the member 51. To be thermally insulating, the element 51 is advantageously made of a titanium-based alloy.

For each core 4 and 5, the assembly formed by the carriage 50 and the member 51 includes a through conduit 52, which is advantageously coaxial with the axis X1 and opens into the heating housing 40 of the respective core 4 or 5.

Preferably, each of the heating means 8 and 9 comprises an electrical heating cartridge that is received within the housings 40. Each heating cartridge advantageously comprises an end forming a metal cylinder containing a high-power resistor, which provides heat by supplying electrical energy via electrical cables of the heating cartridge that are connected to the resistor on one end of the metal cylinder. Each heating cartridge, in particular the metal cylinder, is inserted into the housing 40 via its opening on the end 41 or 42 of the respective core 4 or 5. The electrical cables of the heating cartridge connect the metal cylinder received within the housing 40 up to an electrical power source (not shown) outside of the carriage, and extend along the conduit 52.

The heating means 8 and 9 are configured so as to bring their respective core 4 or 5 to a heating temperature that is high enough to transition the over-moulding material from the injectable state to the crosslinked state when the injectable material is received within the housing 20. The heat transmitted to the cores 4 and 5 by the heating means 8 and 9 is transmitted to the over-moulding material by contact with the cores 4 and 5. The heating temperature Tc is advantageously greater than or equal to the crosslinking or vulcanisation temperature of the over-moulding material. As such, it is provided for the heating temperature of the cores 4 and 5 supplied by the heating means 8 and 9 to be greater than 150° C. In particular in cases in which the over-moulding material is a liquid silicone, it is provided for the heating temperature to be between 180 and 200° C., in particular 200° C., given that the crosslinking temperature of silicone is, e.g., approximately 177° C.

The injector 21 is configured to inject the over-moulding material into the housing 20 via the cavity 2 when the over-moulding material is in the injectable state, whilst the part 11 is received in the closed housing 20 and the cores 4 and 5 are positioned so as to close off the housing 20 within the part 11. During the injection, it is advantageously provided for the over-moulding material to be at RT, or slightly heated, e.g. at a temperature between 30 and 50° C.

Preferably, at least part of the injector 21 is hollow through the cavity 2. This part of the injector 21 is advantageously coaxial with the axis Y1. The hollow part of the injector 21 in the cavity 2 is advantageously connected to an injection device comprising an over-moulding material reservoir and a pump, or any other means suited to inject the over-moulding material under pressure.

The injector 21 of the mould 1 advantageously comprises a conduit 23 opening outside the cavity 2 and an injection nozzle 22 that extends the conduit 23. The conduit 23 is intended to be connected to the injection device.

The nozzle 22 is coaxial with the axis Y1. Preferably, at least the nozzle 22 is formed integrally by the cavity 2, as well as, advantageously, the conduit 23. The nozzle 22 opens into the housing 20. As shown, the end of the nozzle 22 is preferably formed on a radial wall belonging to the part 71 of the housing 20, which wall conforms to the contours of the part 11. When the part 11 is received in the housing 20, the radial injection opening 18 of the part 11 is positioned opposite the nozzle 22, with the opening 18 thus extending the nozzle 22. Thus, the over-moulding material is radially injected through the hollow part 11 via the opening 18 of the hollow part 11 into the hollow part 11 by the injector. In other words, the over-moulding material is supplied to the housing 15 of the hollow part 11 via the opening 18 under the effect of the injector 21.

In order to be injected, it is provided for the over-moulding material to be in its injectable state. To this end, it is advantageously provided for the cores 4 and 5 not to be heated by the heating means 8 and 9 during the injection. Preferably, the over-moulding material is injected at RT or a slightly greater temperature.

By being injected by the injector 21 in its injectable state, the over-moulding material enters the available space delimited by the housing 20, the cores 4 and 5, and the hollow part 11, so as to be shaped by these elements and take the final form of the inner part 12. At a minimum, the over-moulding material is shaped, on the one hand, by the cores 4 and 5, radially inside and, optionally, on one or both of its axial ends, and, on the other, by the hollow part 11, in particular the housing 15, radially on the outside and, optionally, on one or both of its axial ends. Because the inner part 12 is shaped by the inside of the hollow part 11, i.e. the housing 15, the part 12 is over-moulded over the inside of the hollow part 11.

The cooling means 6 and 7 are designed to keep the housing 20 at a cooling temperature that is low enough to avoid excessive deterioration of the hollow part 11 whilst the cores 4 and 5 are being brought to the heating temperature in order to change the state of the over-moulding material received in the housing 20. Preferably, the cooling temperature is reached and never exceeded during the entire over-moulding process. The means 6 and 7 are provided to establish the cooling temperature whilst the heating temperature is reached by the cores 4 and 5.

Advantageously, the value of the cooling temperature is selected so as to be less than or equal to the melting point or glass transition temperature of the support material forming the hollow part 11. More generally, the value of the cooling temperature is selected so as to be low enough to avoid excessive degradation of the mechanical properties of the part 11 whilst the part 12 is changing state. It is provided for the cooling temperature to be less than 110° C. In particular where the support material forming the part 11 is a polyethylene, the cooling temperature is advantageously selected so as to be between 70 and 100° C., in particular depending on the thickness of the part 11. For example, the cooling temperature is 80° C., given that the glass transition temperature of polyethylene is near 110° C., but the mechanical properties of polyethylenes already degrade below the glass transition temperature, e.g. if the polyethylene reaches a temperature greater than 90° C. Alternatively, a cooling temperature less than 70° C. may be provided.

During the change of state of the over-moulding material, it may prove advantageous for the support material of the part 12 to soften temporarily or be slightly degraded on the inside of the part 12, in particular for the areas in contact with the part 11, whilst the support material is kept in a state of mechanical strength that is acceptable for peripheral areas of the part 12 that are in contact with the housing under the effect of the intense cooling provided by the means 6 and 7.

The cooling means 6 and 7 extend along the over-moulding housing 20 on either side of the bond line X1Z1 in order to cool the hollow part 11 radially on the outside when it is received within the housing 20.

In particular, the means 6 extend along the part 71, and the means 7 extend along the part 72. Advantageously, it is provided for the cooling means 6 and 7 to extend as near to the housing 20 as technically possible.

Each cooling means 6 and 7 comprises a network of lines for coolant, e.g. water, passing through the mould 1 or the cavities 2 and 3, respectively, as shown in FIG. 1. For example, the cavity 2 comprises a single hollow coolant line 65 within the cavity 2 that extends in a serpentine fashion along the housing 20 and opens into a inlet 61 and an outlet 62 that are hollow and arranged within the cavity 2, opposite the housing 20. Likewise, the cavity 3 comprises a single hollow coolant line 66 within the cavity 3 that extends in a serpentine fashion along the housing 20 and opens into a inlet 63 and an outlet 64 that are hollow and arranged within the cavity 3, opposite the housing 20. The inlets 61 and 63 and the outlets 62 and 64 are provided for connection to a device for regulating the temperature of and circulating the coolant through the lines 65 and 66.

Preferably, for the cavity 2, a single part contiguously forms the part 71 of the housing 20, the entire coolant line 65, and preferably even the injector 21 nozzle 22. At a minimum, it is provided, in the case of the housing 2, for a single part to contiguously form at least the part 71 and the line 65. Likewise, it is advantageously provided, in the case of the cavity 3, for a single part to contiguously form the part 72 of the housing 20 and the entire coolant line 66. In this case, the cooling of the housing 20 by the cooling means is particularly effective, and the material of the single part may be selected so as to ensure particularly effective evacuation of heat from the housing 20 towards the cooling means 6 and 7.

Preferably, it is provided for each cavity 2 and 3 to be entirely produced by additive manufacturing, i.e. by three-dimensional printing. In particular, it is provided for at least the single piece that contiguously forms both the line 65 and the part 71, and at least the single piece contiguously forming the line 66 and the part 72, to be produced by additive manufacturing. Additive manufacturing has the advantage of being able to give the lines 65 and 66 any desired form whilst ensuring that they are at a very short distance from the housing 20 and giving a very precise shape to the housing 20 itself. Furthermore, because parts obtained by additive manufacturing are contiguous, the heat evacuation from the housing 20 by the means 6 and 7 is optimal.

A preferred additive manufacturing method is laser fusion, which allows for the cavities 2 and 3 to be metal. 'Laser fusion' preferably refers to manufacturing by a selective laser fusion method, an additive manufacturing technique capable of producing metal parts using high-power lasers and progressively and locally, i.e. selectively, fusing a metal power or substrate within a controlled atmosphere.

Moreover, given the recent technical progress made in the field of additive manufacturing, this manufacturing method allows several cavities to be made for the same machine, which can be installed in turn on the machine in order to obtain bi-material parts of different shapes. Thus, on a single machine, it is easy to replace a first mould with another, which is manufactured by the same additive manufacturing method, in order to obtain a bi-material part of a different shape.

As for the manufacturing of the other elements of the machine, any conventional method suited for manufacturing a moulding machine may be used.

Preferably, the cores 4 and 5 are only brought to the heating temperature when the over-moulding material has been completely injected into the housing 20, i.e. when the part 12 is completely shaped. This temperature is maintained for a certain period of time, depending in particular on the over-moulding material selected and the thickness of the part 12. The over-moulding material then goes from the injectable state to the crosslinked state, where it is fixed within the housing 15. The crosslinking and the heating temperature optionally have the effect of bonding the over-moulding material of the part 12 with the support material of the part 11 at the interface of these two parts, thus reinforcing the anchoring of the part 11 on the part 12. Cooling by the means 6 and 7 takes place at the same time as this heating in order to preserve the integrity of the part 11.

In short, the machine according to the invention makes it possible to carry out a method for obtaining the bi-material part 10, advantageously comprising:

a first step, in which the mould 1 is opened, and the cores 4 and 5 are removed, and the part 11, already formed, is arranged within the housing 20;

a second step, in which the mould 1 is closed and the cores 4 and 5, which are not heated by the means 8 and 9, are placed within the part 11;

a third step, in which, without heating the means 8 and 9 and preferably without cooling the mould 1, the injector 21 injects the over-moulding material into the housing 20, such that the over-moulding material at least partially enters the housing 20 in order to be shaped by the part 11, the cores 4 and 5, and, optionally, the housing 20 itself, in order to form the part 12;

a fourth step, in which the part 12 is brought from the injectable state to the crosslinked state by bringing the cores 4 and 5 to the heating temperature by means of the heating means 8 and 9, whilst keeping the housing 20 at a temperature less than or equal to the cooling temperature using the cooling means 6 and 7 in order to avoid excessive degradation of the part 11;

a fifth step, in which the mould 1 and the cores 4 and 5 are cooled and the heating means 8 and 9 are turned off, optionally whilst cooling by the cooling means 6 and 7 continues;

a sixth step, in which the mould 1 is opened and the cores 4 and 5 are removed in order to extract the part 10 obtained.

In one variant, the housing 20 may optionally act as a mould housing for the hollow part 11 by having a shape suited for shaping the support material of the hollow part 11. In this case, it is not provided for the part 11, already formed, to be placed in the housing 20, but rather for the part 11 to be shaped in situ in the housing 20. To this end, the support material is injected into the housing 20 in an injectable, i.e. softened or liquid, state. In this case, the method for obtaining the part 10 comprises a preliminary step of moulding the part 11, in which the injector 21, or another injector of the machine, injects the support material in the injectable state such that the support material is externally shaped by the housing 20. In this case, the housing 20 serves as a mould housing for the part 11. Provision may be made for the insertion of one or more specific cores, different to the cores 4 and 5, into the housing 20 of the mould 1 in order to shape the housing 15 of the hollow part 11 for the injection of the support material. The injection of the support material preferably includes bringing the support material to a temperature that is high enough to bring it to or keep it in an injectable state. For example, this temperature is greater than the glass transition temperature or melting point of the support material. Once the injection has occurred, the step of moulding the hollow part 11 advantageously includes cooling the support material that is shaped in the housing 20, preferably using the cooling means 6 and 7. Then, the inner part 12 is over-moulded as described supra.

In one variant, the support material that forms the hollow part 11 is a thermosetting polymer or an inorganic material such as a metal alloy or glass. In practice, any material that is not degraded when it is brought to the cooling temperature may be selected for use as the support material.

In one variant, the over-moulding material forming the inner part 12 is an elastomer that does not contain silicone, is based on non-liquid silicone, or is a non-elastomeric thermosetting polymer, e.g. a crosslinked polyurethane.

In one variant, the housing 15 is obstructed by a transverse partition, so as to define a respective separate compartment at each end 13 and 14.

In one variant, only one of the longitudinal ends of the hollow part 11 is open whilst the other is closed, and the hollow part 11 is blind, e.g. in the form of a pouch or a bell.

In one variant, the machine comprises several injectors, including the injector 21 and at least one other injector, which is arranged, e.g., in the cavity 3 or one of the cores 4 and 5.

In one variant, a number of cores other than two is provided. For example, in order to obtain a bi-material part having a blind hollow part, a single core, received in the blind housing of the hollow part, maybe provided for over-moulding.

Any characteristic described supra for any of the embodiments or variants may be implemented in the other embodiments and variants described supra.

The invention claimed is:

1. A machine for obtaining a bi-material part, comprising:
a mold delimiting an over-molding housing configured to receive a hollow part of the bi-material part;
a cooler arranged along the over-molding housing;
at least one core, at least one part of which is positionable within the hollow part when the hollow part is received within the over-molding housing, wherein the at least one core comprises a heater for heating the machine, wherein the heater brings the at least one core to a heating temperature greater than 150° C.; and
an injector configured to inject an over-molding material into the over-moulding housing via said mold when the over-molding material is in an injectable state, such that the over-molding material enters the over-molding housing to be shaped radially inward by said at least one core and radially outward by the hollow part, so as to form an inner part of the bi-material part over-molded over the inside of the hollow part, wherein said cooler keeps the over-molding housing at a cooling temperature of less than 110° C., while said at least one core is brought to the heating temperature by said heater in order to transition the over-molding material from the injectable state to a crosslinked state when the over-molding material has been injected into the over-molding housing by the injector.

2. The machine according to claim 1, wherein said cooler comprises at least one coolant line, and said mold comprises at least one cavity contiguously forming at least one part of the over-molding housing and said at least one coolant line.

3. The machine according to claim 1, wherein said at least one core comprises:
an outer layer for conforming the over-molding material to form the inner part; and
a thermally conductive core radially surrounded by said outer layer that delimits a heater housing receiving at least part of said heater.

4. The machine according to claim 1, wherein said heater comprises an electrical heating cartridge contained in said at least one core.

5. The machine according to claim 1, wherein, for each core of said at least one core, the machine comprises:
a respective carriage to which the core is affixed, wherein the carriage is movable relative to said mold in order to position the core within the hollow part when the hollow part is received within the over-molding housing; and
a respective heat insulating member formed of a titanium-based alloy and interposed between said carriage and the core.

6. The machine according to claim 1, wherein said heater is configured to bring the at least one core to a heating temperature between 180° C. and 220° C.

7. The machine according to claim 1, wherein said heater is configured to bring the at least one core to a heating temperature of 200° C.

8. The machine according to claim 1, wherein said cooler keeps the over-molding housing at a cooling temperature between 70° C. and 100° C.

9. The machine according to claim 1, wherein said cooler keeps the over-molding housing at a cooling temperature of 80° C.

10. The machine according to claim 3 wherein said outer layer is formed of stainless steel.

11. The machine of claim 3 wherein the core is formed of beryllium bronze.

* * * * *